United States Patent [19]
Takai

[11] Patent Number: 6,097,947
[45] Date of Patent: Aug. 1, 2000

[54] METHOD FOR DETECTING FAILURE MOBILE STATION IN CELLULAR MOBILE COMMUNICATION NETWORK THROUGH TRANSMISSION POWER CONTROL

[75] Inventor: Kenichi Takai, Saitama, Japan

[73] Assignee: NEC Corporation, Tokyo, Japan

[21] Appl. No.: 09/059,308

[22] Filed: Apr. 14, 1998

[30] Foreign Application Priority Data

Apr. 22, 1997 [JP] Japan ................................ 9-104949

[51] Int. Cl.[7] .............................. H04Q 7/20; H04Q 7/30; H04Q 7/32; H04Q 7/34
[52] U.S. Cl. ...................... 455/424; 455/522; 455/517; 455/69; 455/68; 455/127; 455/550; 455/424
[58] Field of Search ................................ 455/424, 522, 455/517, 69, 403, 500, 68, 67.1, 38.3, 127, 422, 423, 550

[56] References Cited

U.S. PATENT DOCUMENTS

| | | | |
|---|---|---|---|
| 5,265,119 | 11/1993 | Gilhousen et al. | 455/522 |
| 5,267,262 | 11/1993 | Wheatley | 455/522 |
| 5,333,175 | 7/1994 | Ariyavisitakul et al. | 455/522 |
| 5,590,409 | 12/1996 | Sawahashi et al. | 455/522 |

FOREIGN PATENT DOCUMENTS

| | | |
|---|---|---|
| 53-73001 | 6/1978 | Japan . |
| 5-48676 | 2/1993 | Japan . |
| 7-46180 | 2/1995 | Japan . |
| 7-74727 | 3/1995 | Japan . |
| 8-32514 | 2/1996 | Japan . |

OTHER PUBLICATIONS

Japanese Office Action dated Aug. 10, 1999, with partial translation.

*Primary Examiner*—Fan Tsang
*Assistant Examiner*—Keith Ferguson
*Attorney, Agent, or Firm*—McGinn & Gibb, P.C.

[57] ABSTRACT

A cellular mobile communication network in a code division multiple access system includes plural mobile stations and at least one base station, and the at least one base station periodically supplies a transmission power control instruction representative of decrease or increase of the transmission power of a transmit signal from each mobile station to the at least one base station; when the base station receives the transmit signal from a mobile station, the base station measures the electric power to see whether or not the mobile station is faithful to the transmission power control instruction; if the mobile station repeats the disobedience, the mobile station is diagnosed to be a failure station serving as a serious interference power source.

14 Claims, 2 Drawing Sheets

METHOD FOR DETECTING FAILURE MOBILE STATION IN CELLULAR MOBILE COMMUNICATION NETWORK THROUGH TRANSMISSION POWER CONTROL

FIELD OF THE INVENTION

This invention relates to a cellular mobile communication technology between a mobile station and a base station and, more particularly, to a method for defecting failures mobile station through transmission power control in a code division multiple access system.

DESCRIPTION OF THE RELATED ART

Various signal transmission technologies have been proposed for a radio communication network such as a cellular mobile communication network. A frequency division multiple access system is one of the signal transmission technologies, and is usually abbreviated as "FDMA" system. In the frequency division multiple access system, channels are divided along the frequency axis, and a piece of information is transferred through the divided channel. A time division multiple access system is another signal transmission technology, and is usually abbreviated as "TDMA" system. The channels are divided along the time axis, and a piece of information is transferred through the divided channel.

A code division multiple access system is yet another signal transmission technology, and is usually abbreviated as "CDMA" system. The channels are divided by using orthogonal characteristics of a code, and a piece of information is transferred through the divided channel. The signal transmission technologies are evaluated from the aspect that how the finite communication resources are effectively utilized, because the effective utilization of finite communication resources makes the number of subscribers different. Effective utilization techniques have been developed. The narrow bandwidth modulation is a typical example of the effective utilization technique for the frequency division multiple access system, and the high efficiency encoding technique and the high speed switching technique have been developed for the time division multiple access system.

Plural subscribers share a certain frequency for the communication in the code division multiple access system, and SIR (Signal to Interference noise Ratio), which is the ratio between received signal transmission power and interference power, for an admittable error rate determines the capacity of the radio communication system. In the actual cellular mobile communication network, a base station covers a certain area, which is called as "cell", and there are plural mobile stations in the cell. The distance from the base station is different between the plural mobile stations, and the base station receives the signals from mobile stations at different signal transmission power levels. If a signal at small signal transmission power is interfered with by another signal at large signal transmission power, the signal does not satisfy the minimum SIR, and the mobile station can not continue the radio communication to the base station.

The code division multiple access technology for the cellular mobile communication system requires a transmission power controlling technology, which controls the mobile stations to keep the transmission power levels of the received signals at the base station constant. Japanese Patent Publication of Unexamined Application (JPA) No. 8-32514 discloses a transmission power controlling technology for mobile stations forming a cellular communication network together with a base station, and proposes to regulate the power level of a signal transferred from the mobile stations through an open-loop control or a closed-loop control depending upon the power level of a received signal. In the open-loop control, the mobile station measures the power level of the signal transferred from the base station, and actively changes the power level of the transmission signal. On the other hand, when the mobile station and the base station are under the closed-loop control, the base station instructs the power level of the transmission signal to the mobile station depending upon the power level of the signal transferred from the mobile station to the base station, and the mobile station is responsive to the instruction for changing the power level of the transmission signal. While the mobile stations are communicating with the base station, the propagation characteristics are drastically varied due to fading and shadowing, and the prior art transmission signal controlling technology disclosed in the Japanese Patent Publication of Unexamined Application selectively utilizes the open-loop control and the closed-loop control so as to keep SIR over the minimum value.

Another prior art transmission power controlling technology is disclosed in Japanese Patent Publication of Unexamined Application (JPA) No. 7-74727. The Japanese Patent Publication of Unexamined Application proposes a compromise between a time division multiplex (TDD) and the code division multiple access, i.e., CDMA+TDD. A certain frequency is assigned to the upward route from a mobile station to a base station and the downward route from the base station and the mobile station, and variation of signal propagation characteristics is estimated for the transmission power control.

The prior art transmission power controlling technologies encounter a problem in detectability of trouble with a mobile station or a failure mobile station. The technical goal of the prior art transmission power controlling technologies has only been directed to an increase of the communication capacity through a high-speed high-precision transmission power control, and the detection of a failure mobile station is not taken into account. If a mobile station becomes uncontrollable, the failure mobile station seriously interferes with the communication between another mobile station and the base station. Although the system designer ignores the influence of the failure mobile station in the simulation, the influence is serious, and the failure mobile station jeopardizes the management of the cellular mobile communication system.

SUMMARY OF THE INVENTION

It is therefore an important object of the present invention to provide a transmission power controlling method for a code division multiple access system, in which a system manager easily locates a failure mobile station without any additional equipment.

To accomplish the object, the present invention proposes to compare the electric power of a received signal with the electric power of a previous received signal so as to determine a mobile station to faithful to a transmission power control instruction.

In accordance with one aspect of the present invention, there is provided a method for detecting a failure mobile station forming a wireless communication network together with at least one base station, and includes determining the electric power of a first signal received by the at least one base station, supplying a transmission power control instruction to the mobile station, changing the electric power of a second signal to be supplied from the mobile station to the at least one base station in response to the transmission power control instruction, determining the electric power of the second signal received by the at least one base station, comparing the electric power of the second signal with the electric power of the first signal to see whether or not a relative relation therebetween is consistent with the transmission power control instruction and diagnosing the mobile station as a failure station when the relative relation is inconsistent with the transmission power control instruction.

BRIEF DESCRIPTION OF THE DRAWINGS

The features and advantages of the method of controlling a transmission power will be more clearly understood from the following description taken in conjunction with the accompanying drawings in which.

DESCRIPTION OF THE PREFERRED EMBODIMENT

Figure 1:
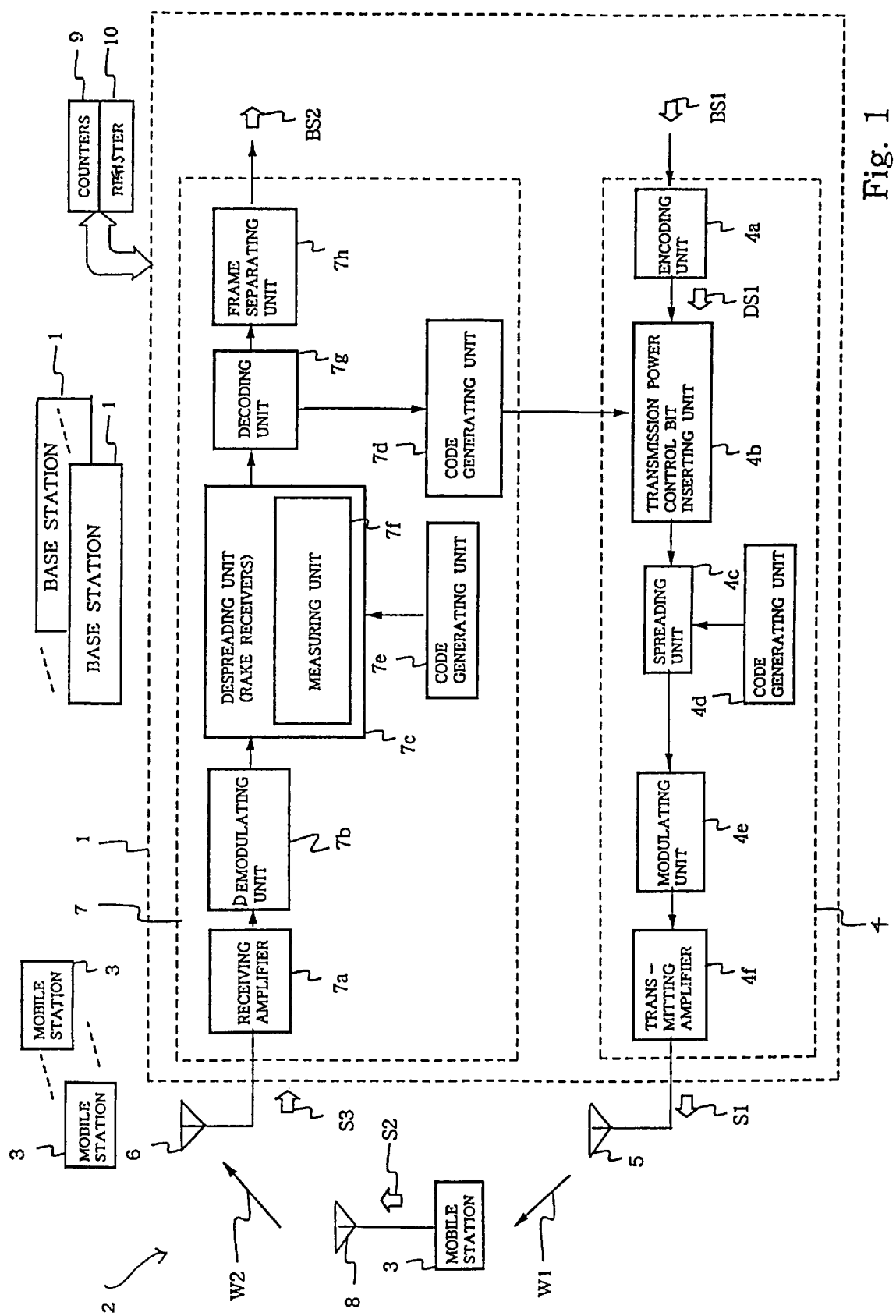
FIG. 1 is a block diagram showing a cellular mobile communication system.

Referring first to FIG. 1 of the drawings, plural base stations 1 form a cellular mobile communication system 2 together with plural mobile stations 3. Although one of the plural mobile stations 3 is communicating with a base station in FIG. 1, each of the mobile stations 3 concurrently communicates with the plural base stations, and the mobile station 3 is similar in those of the prior art cellular mobile communication system. For this reason, description is focused on the base station 1.

The base station 1 includes a signal transmitting section 4, a signal transmitting antenna 5, a signal receiving section 6 and a signal receiving antenna 7. The signal transmitting section 4 forms a transmit signal Si from an input bit string BS1 representative of a piece of information or input data, and supplies the transmit signal S1 to the signal transmitting antenna 5. The transmitting antenna 5 broadcasts an electric wave W1 corresponding to the transmit signal S1, and the mobile station 3 receives it. The mobile station 3 processes the piece of information contained in the electric wave W1, and produces a transmit signal S2 representative of another piece of information or other data. The transmit signal S2 is transferred to an antenna 8, and an electric wave W2 is broadcast therefrom. The signal receiving antenna 6 catches the electric wave W2, and the signal receiving antenna 6 reproduces the other data in a received signal S3. The received signal S3 is supplied to the signal receiving section 7. The signal receiving section 7 extracts the other data, and processes it so as to form an output bit string BS2. The control sequence from the input of the bit string BS1 to the output of the bit string BS2 is referred to as "control cycle". Thus, the communication scheme is similar to that of the prior art cellular mobile communication system. The signal transmitting section 4 and the signal receiving section 7 are detailed as follows.

The signal transmitting section 4 includes an encoding unit 4a and a transmission power control bit inserting unit 4b connected to the encoding unit 4a. The input bit string BS1 is supplied to the encoding unit 4a, and the encoding unit 4a encodes the input bit string BS1 into a digital signal DS1. The digital signal DS1 is supplied from the encoding unit 4a to the transmission power control bit inserting unit 4b, and the transmission control bit inserting unit 4b adds transmission power control bits to the digital signal DS1. The transmission power control bits are representative of a transmission power control instruction representative of change of the transmission power of a transmit signal from the mobile station 3 to the base station 1, and is supplied from the signal receiving section 7.

The signal transmitting section 47 further includes a spreading unit 4c connected to the transmission power control bit inserting unit 4b and a code generating unit 4d. The cod e generating unit 4d generates PN (Pseudo Noise) codes, and supplies the PN codes to the spreading unit 4c. The spreading unit 4c multiplies the data supplied from the transmission power control bit inserting unit 4b with the PN codes so as to spread the bandwidth of the transmit signal S1.

The signal transmitting section 4 further includes a modulating unit 4e connected to the spreading unit 4c and a transmitting amplifier 4f connected to the modulating unit 4e. The modulating unit 4e up-converts the spread data to a radio frequency band, and the transmitting amplifier 4f amplifies the power of the transmit signal. The amplified transmit signal, i.e., the transmit signal S1 is supplied from the transmitting amplifier 4f to the signal transmitting antenna 5.

The signal receiving section 7 includes a receiving amplifier 7a connected to the signal receiving antenna 7 and a demodulating unit 7b connected to the receiving, amplifier 7a. The receiving amplifier 7a amplifies the power of the received signal S3, and supplies the amplified received signal S3 to the demodulating unit 7b. The demodulating unit 7b primarily demodulates the received signal in a radio frequency band.

The signal receiving section 7 further includes a despreading (or RAKE receiving) unit 7c connected to the demodulating unit 7b, a code generating unit 7d connected between the despreading unit 7c and the transmission power control bit inserting unit 4b and a code generating, unit 7e connected to the despreading unit 7c. The despreading unit 7c includes a measuring unit 7f. The despreadinal unit 7c secondarily demodulates the received signal through a despreading function, and the measuring unit 7f measures the signal power of the received signal in a desired waveform and an interference power. The interference power contains thermal noise. The measuring unit 7f supplies pieces of information representative of the received signal power and the interference power to the code generating unit 7d. The code generating unit 7e generates PN codes, and supplies the PN codes to the despreading unit 7e. The code generating unit 7d determines the transmission power to be imparted to the transmit signal S1 in the next control cycle, and generates the transmission power control bits representative of the transmission power control instruction. The transmission power control bits are supplied from the code generating unit 7d to the transmission power control bit inserting unit 4b.

The signal receiving section 7 further includes a decoding u nit 7g connected to the despreading unit 7c and a frame separating unit 7h connected to the decoding unit 7g. The decoding unit 7g executes a predetermined process on the received signal such as an error correction and an interleave after the despreading operation. The frame separating unit 7h extracts a bit string representative of the other data from the output of the decoding unit 7g formatted in a frame structure.

Description is hereinbelow made on an operation of the cellular mobile communication system. Assuming now that the mobile station 3 broadcasts the electric wave W2 representative of a first piece of information from the antenna 8, the electric wave W2 reaches the signal receiving antenna 6, and is taken into the receiving section 7 as the received signal S3. An interference signal also reaches the signal receiving antenna 6, and is mixed into the received signal S3. Thus, the received signal S3 contains a signal component representative of the first piece of information and an interference component.

The receiving amplifier 7a amplifies the received signal S3, and supplies the received signal S3 to the demodulating unit 7b after the power amplification. The received signal S3 is in the radio bandwidth. In the demodulating unit 7b, the received signal S3 is down-converted to the signal in a base bandwidth to be input into the despreading portion 7c through the primary demodulation.

Subsequently, the spread signal bandwidth is recovered to an original bandwidth in the despreading portion 7c. The despreading unit 7c makes correlation between the PN codes generated in the code generating unit 7e and the received signals. At the same time, the RAKE receivers separate incoherent multi-path signals.

The measuring unit 7f measures the signal power in the desired waveform received from the mobile station 3 after executing the RAKE synthesis or synthesizing demodulated signals acquired by the respective RAKE receivers through separation of the multi-path signals and the interference power, and the signal power and the interference power are reported to the code generating unit 7d. The code generating unit 7d determines the transmission power control instruction for the transmit signal S2 to be transmitted from the mobile station 3 in the next control cycle. The code generating unit 7d produces the transmission power control bits representative of the transmission power control instruction, and supplies it to the transmission power control bit inserting unit 4b.

The received signal is supplied to the decoding unit 7g, and experiences the above-described process such as an error correction, a deinterleave or the like in the decoding portion 7g. The received signal is transmitted to the frame separating unit 7h, and is coded in the frame format. The first piece of information is extracted from the received signal, and the frame separating unit 7h forms the bit string BS2 from the first piece of information.

The input bit string BS2 is supplied to the signal transmitting section 4 in the next control cycle, and is assumed to represent a second piece of information. The encoding unit 4a encodes the input bit string BS1 into the digital signal DS1, and supplies the digital signal DS1 to the transmission power control bit inserting unit 4b. The transmission power control bits have been already supplied from the code generating unit 7d to the transmission power control bit inserting unit 4b.

The transmission power bits are added to the digital signal DS1, and, thereafter, the digital signal DS1 is transmitted to the spreading unit 4c. The code generating unit 4d supplies the PN codes to the spreading unit 4c. The spreading unit 4c multiplies the value represented by the digital signal DS1 by the value represented by the PN codes, and spreads the signal bandwidth of the data. The digital signal representing the spread data is up-converted to the radio frequency band by the modulation unit 4e, and, thereafter, the transmitting amplifier 4f amplifies the radio frequency signal to the predetermined power. The amplified radio frequency signal is the transmit signal S1, and is transmitted from the signal transmission antenna 5 to the mobile station 3.

The mobile station 3 extracts the second piece of information, and processes it. When the mobile station 3 broadcasts the transmit signal S2 representative of a third piece of information from the antenna 8, the mobile station 3 regulates the transmission power to a certain magnitude in response to the transmission power control instruction given thereto through the transmission power control bits.

Subsequently description is made on a method of detecting a failure mobile station according to the present invention with reference to FIG. 2. The base station 1 executes the program sequence realizing the method according to the present invention.

First, the base station 1 sets a failure counter 9 to zero as by step S21. The failure counter 9 stores the number of the control cycles not to respond to the transmission power control bits. As described hereinbefore, the base station 1 instructs the mobile station 3 to change the transmission power through the transmission power control bits, and the mobile station 3 is expected to transmit the transmit signal S2 at a certain magnitude of transmission power in response to the transmission power control instruction. However, the mobile station 3 does not always respond to the transmission power control instruction. A transmission without response to the transmission power control instruction may indicate a trouble with the mobile station 3. The base station 1 counts the number of signal transmissions without response to the transmission power control instruction as described hereinbelow in detail. For this reason, the base station 1 firstly makes the failure counter 9 ready for count.

Subsequently, the base station 1 gives a threshold value k to a register 10 assigned to a mobile station 3 to be monitored as by step S22. The threshold value k is a criterion for diagnosing a mobile station 3 to be uncontrollable. In other words, if the value stored in the failure counter 9 reaches the threshold value k, the base station 1 determines the mobile station 3 to be a failure station.

After the storage of the threshold value k in the register 10, the base station 1 monitors the communication with the mobile station 3 through the following routine. When the received signal S3 reaches the signal receiving section 7, the despreading unit 7c measures the electric power of the desired waveform in the received signal and the interference power as by step S23. The interference power contains the thermal noise. The despreading unit 7c may average the electric power of the desired waveform during each control cycle so as to decrease a noise component in the received signal.

Subsequently, the code generating unit 7d determines the transmission power control instruction for the transmission power to be required in the next control cycle on the basis of the measurement at step S23, and produces the transmission power control bits representative of the transmission power control bits. The code generating unit 7d supplies the transmission power control bits to the signal transmitting section 4. The transmission power control bit inserting unit 4b adds the transmission power control bits to the digital signal DS1 representative of a piece of information, and the spreading unit 4c spreads the signal bandwidth for the bit string through the multiplication with the PN codes. The modulating unit 4e up-converts the output of the spreading unit 4c to the high-frequency band, and the transmitting amplifier 4f amplifies the output of the modulating unit 4e so as to supply the transmit signal S1 to the transmitting antenna 5. Thus, the signal transmitting section 4 informs the mobile station 3 of the transmission power control instruction together with the piece of information as by step S24.

The mobile station 3 receives the electric wave W1, and restores the transmission power control bits representative of the transmission power control instruction. Then, the mobile station 3 regulates the transmission power to a certain magnitude in response to the transmission power control instruction, and transmits a message from the antenna 8 to the base station 1 at the certain magnitude of transmission power. The base station 1 receives the message as the received signal S3, and measures the electric power as by step S25. The base station 1 may average the electric power similar to step S23.

The base station 1 compares the magnitude of electric power measured at step S25 with the magnitude of electric power measured at step S23 to see whether the relative relation between the magnitudes is consistent with the transmission power control instruction indicative of a decrease of the transmission power as by step S26. The transmission power control instruction at step S24 is assumed to represent decrease of the transmission power. When the relative relation is indicative of in a decrease of from the electric power measured at step S23 to the electric power measured at step S25, the answer at step S26 is given as affirmative. On the other hand, when the electric power is increased from the measurement at step S23 to the measurement at step S25, the answer at step S26 is given as negative. However, even if the base station 1 instructs the mobile station 3 to increase the transmission power, the mobile station 3 may decrease the transmission power due to the transmission power control instruction from another base station. While the mobile station 3 is in the soft status, the mobile station 3 is communicating with more than one base station, and the plural base stations 1 independently supply the transmission power control instructions to the mobile station 3. If the transmission power control instructions conflict with one another, the transmission power control instruction representative of a decrease is prioritized in the code division multiple access system, because the increase of transmission power makes the interference serious. Thus, the decrease of transmission power against the transmission power control instruction does not always indicate a trouble with the mobile station 3. On the other hand, when a mobile station 3 does not follow the transmission power control instruction representative of decrease of the transmission power, the mobile station 3 is possibly in trouble. For this reason, the base station 1 checks the relative relation whether to be consistent with the transmission power control instruction indicative of decrease of the transmission power or not at step S26.

If the answer at step S26 is given as affirmative, the base station 1 resets the failure counter 9 to zero in step S27, and returns to step S23. Thus, while the mobile station 3 is faithful to the transmission power control instruction representative of a decrease of the transmission power, the base station 1 diagnoses the mobile station 3 to be non-defective, and reiterates the loop consisting of steps S23 to S27.

On the other hand, if the answer at step S26 is given as negative, the base station 1 proceeds to step S28, and increments the failure counter 9. In step S28, "n" represents the value stored in the failure counter 9.

Subsequently, the base station 1 compares the value n stored in the failure counter 9 with the threshold value k to see whether or not the negative answer at step S26 is repeated k times as by step S29. If the answer at step S29 is given as negative, the base station does not diagnose the mobile station 3 to be a failure, and returns to step S23. Thus, the base station 1 reiterates the loop consisting of steps S23 to S29 until the failure counter 9 reaches the threshold value L. Thus, the base station 1 waits the diagnosis until the repetition of inconsistency k times. This is because of the fact that the mobile station 3 temporarily behaves as if uncontrollable. In detail, while a mobile station 3 is communicating with the base station 1, the propagating conditions are varied with time due to the shadowing by an obstacle and the fading by the multipath. In this situation, even if the mobile station 1 transmits the transmit signal S2 at constant transmission power, the electric power of the received signal S3 is unintentionally varied. This means that there is a possibility that the electric power of the received signal S3 is increased against the transmission power control instruction indicative of decrease of the transmission power. However, such a temporary inconsistency is never repeated k times. In other words, if the inconsistency is repeated k times, the mobile station 3 is surely troubled. Thus, the threshold value k prevents the base station 1 from making an erroneous diagnosis.

If the inconsistency at step S26 is repeated k times, the answer at step S29 is given as affirmative, and the base station 1 diagnoses the mobile station 3 to be a failure in step S30. The base station 1 specifies the failure mobile station 1, and reports the failure mobile station to a host station in step S31.

Figure 2:
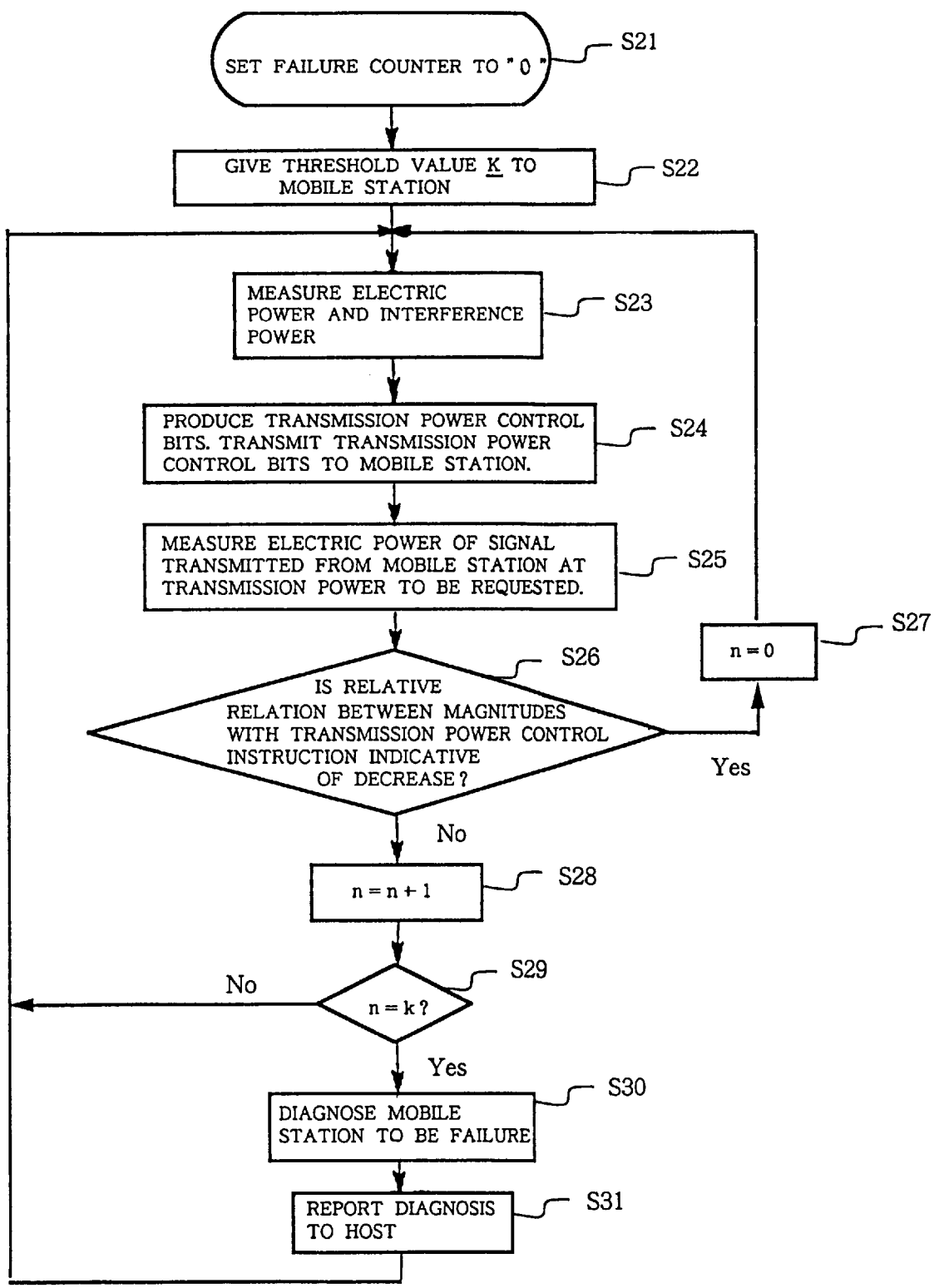
FIG. 2 is a flow chart showing a program sequence executed in the cellular mobile communication system.

Although description is focused on one of the mobile stations 3 communicating with one of the base stations 1, the diagnosing sequence shown in figure 2 is concurrently carried out for each of the mobile stations 3, and all the failure mobile stations 3 are appropriately specified, if any.

As will be appreciated from the foregoing description, the cellular mobile communication system according to the present invention checks the electric power of the received signal to see whether or not the mobile station 3 faithfully respond to the transmission power control instruction, and specifies the failure mobile station. The diagnosis is carried out through software on the basis of the electric power of the received signal. This means that the base station 1 does not require any additional equipment. When a failure mobile station is found, the system manager removes the failure mobile station from the cellular mobile communication system, and the cellular mobile communication system is free from the serious interference power source.

The measuring unit 7c averages the electric power of the received signal during each control cycle, and the undesirable influence of fading and noise are minimized in the average electric power. For this reason, she code generating unit 7d produces the transmission power control instruction appropriate to the mobile station.

Finally, when the inconsistency is repeated, the base station 1 diagnoses the mobile station as a failure station, and makes the diagnosis correct.

Although a particular embodiment of the present invention has been shown and described, it will be apparent to those skilled in the art that various changes and modifications may be made without departing from the spirit and scope of the present invention.

For example, a host station may carry out the diagnosis on the basis of the report supplied from plural base stations. The present invention is applicable to any wireless communication network in so far as the transmission power of the mobile station is controlled by the base station.

What is claimed is:

1. A method for detecting a failure mobile station forming a wireless communication network together with at least one base station, comprising:

a) determining the electric power of a first signal supplied from said failure mobile station to said at least one base station by said at least one base station;

b) supplying a transmission power control instruction from said at least one base station to said mobile station;

c) changing the electric power of a second signal to be supplied from said mobile station to said at least one base station by said failure mobile station in response to said transmission power control instruction;

d) determining the electric power of said second signal supplied from said mobile station to said at least one base station by said at least one base station;

e) comparing said electric power of said second signal with said electric power of said first signal to see whether or not a relative relation therebetween is consistent with said transmission power control instruction by said at least one base station; and f) diagnosing said mobile station as a failure station by said at least one base station when said relative relation is inconsistent with said transmission power control instruction.

2. The method as set forth in claim 1, wherein the electric power is averaged during a certain period so as to determine said electric power of said first signal and said electric power of said second signal.

3. The method as set forth in claim 1, wherein said transmission power control instruction is representative of a decrease of transmission power.

4. The method as set forth in claim 1, wherein said mobile station and said at least one base station form a cellular mobile communication network together with other mobile stations.

5. The method as set forth in claim 4, wherein said cellular mobile communication network is established in a code division multiple access technology.

6. A method for detecting a failure mobile station forming a wireless communication network together with at least one base station, comprising:

a) determining the electric power of a first signal received by said at least one base station;

b) supplying a transmission power control instruction to said mobile station;

c) changing the electric power of a second signal to be supplied from said mobile station to said at least one base station in response to said transmission power control instruction;

d) determining the electric power of said second signal received by said at least one base station;

e) comparing said electric power of said second signal with said electric power of said first signal to see whether or not a relative relation therebetween is consistent with said transmission power control instruction;

(f) repeating said step a) to said step e) until the inconsistency is repeated a predetermined number of times; and g) diagnosing said mobile station as a failure station when said relative relation is inconsistent with said transmission power control instruction.

7. A method for detecting a failure mobile station forming a wireless communication network together with at least one base station, comprising:

a) determining a power of a first signal received by said at least one base station;

b) supplying a transmission power control instruction to said mobile station;

c) changing a power of a second signal to be supplied from said mobile station to said at least one base station in response to said transmission power control instruction;

d) determining the power of said second signal received by said at least one base station;

e) comparing said power of said second signal with said power of said first signal to judge whether a relative relation therebetween is consistent with said transmission power control instruction; and f) determining said mobile station is a failure station if said relative relation continues not to be is not consistent with said transmission power control instruction, then repeating said step a) to said step e).

8. The method as set forth in claim 7, wherein said step a) to said step e) is repeated a predetermined number of times until said relative relation becomes consistent with said transmission power control instruction.

9. The method as set forth in claim 7, further comprising:

if, in step e), said relative relation is judged not to be consistent with said transmission power control instruction, then diagnosing said mobile station as a failure station.

10. The method as set forth in claim 7, wherein the power is averaged during a certain period so as to determine said power of said first signal and said power of said second signal.

11. The method as set forth in claim 7, wherein said transmission power control instruction is representative of a decrease of transmission power.

12. The method as set forth in claim 7, wherein said power comprises electric power.

13. The method as set forth in claim 7, wherein said mobile station and said at least one base station form a cellular mobile communication network together with other mobile stations.

14. The method as set forth in claim 13, wherein said cellular mobile communication network is established in a code division multiple access technology.

* * * * *